United States Patent
Aubert

(10) Patent No.: US 11,853,752 B2
(45) Date of Patent: Dec. 26, 2023

(54) MIGRATION OF WEB APPLICATIONS BETWEEN DIFFERENT WEB APPLICATION FRAMEWORKS

(71) Applicant: EMC IP Holding Company LLC, Hopkinton, MA (US)

(72) Inventor: Raphaël Aubert, Montreal (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 694 days.

(21) Appl. No.: 16/588,168

(22) Filed: Sep. 30, 2019

(65) Prior Publication Data
US 2021/0096853 A1    Apr. 1, 2021

(51) Int. Cl.
G06F 9/44 (2018.01)
G06F 8/76 (2018.01)
G06F 9/445 (2018.01)
G06F 9/54 (2006.01)
G06F 8/71 (2018.01)

(52) U.S. Cl.
CPC ............ G06F 8/76 (2013.01); G06F 8/71 (2013.01); G06F 9/44521 (2013.01); G06F 9/44594 (2013.01); G06F 9/54 (2013.01)

(58) Field of Classification Search
CPC .......... G06F 8/76; G06F 8/71; G06F 9/44521; G06F 9/44594; G06F 9/54
See application file for complete search history.

(56) References Cited

U.S. PATENT DOCUMENTS

| | | |
|---|---|---|
| 2003/0154239 A1 | 8/2003 | Davis et al. |
| 2007/0147306 A1 | 6/2007 | Halpern |
| 2010/0138817 A1* | 6/2010 | Dubinsky ........... G06F 11/3644 717/148 |
| 2011/0022571 A1* | 1/2011 | Snyder .................. G06F 16/955 717/174 |
| 2011/0145360 A1* | 6/2011 | Sheshagiri .............. G06F 9/547 717/110 |

(Continued)

OTHER PUBLICATIONS

Michael Geers, "Micro Frontends—Extending the Microservice Idea to Frontend Development," micro-frontends.org/, downloaded Sep. 30, 2019, 6 pages.

*Primary Examiner* — Chat C Do
*Assistant Examiner* — Lenin Paulino
(74) *Attorney, Agent, or Firm* — Ryan, Mason & Lewis, LLP

(57) ABSTRACT

A method includes identifying a portion of a web application to be migrated from a first to a second web application framework, selecting at least one page element in the portion of the web application that is to be migrated, generating an application chunk for the selected page element as a self-contained web application that utilizes the second web application framework, and replacing a portion of software code of the web application corresponding to the selected page element with chunk definition metadata defining content of the selected page element, dependencies of the selected page element, and triggers for loading the generated application chunk. The method also includes creating an application core comprising a user interface shell configured to load the generated application chunk and one or more other application chunks of the web application responsive to activation of user interface elements of the web application corresponding to the defined triggers.

20 Claims, 6 Drawing Sheets

(56) References Cited

U.S. PATENT DOCUMENTS

| | | |
|---|---|---|
| 2012/0166963 A1 | 6/2012 | Kohli et al. |
| 2014/0359129 A1* | 12/2014 | Sharma .................. H04L 67/10 709/226 |
| 2015/0286511 A1* | 10/2015 | Mickens ................ G06F 9/544 719/320 |
| 2016/0285958 A1 | 9/2016 | Das et al. |
| 2017/0154017 A1* | 6/2017 | Kristiansson ......... G06F 40/143 |
| 2018/0129485 A1* | 5/2018 | Ryan ...................... G06F 16/95 |
| 2019/0245910 A1* | 8/2019 | Abrahami ............ G06F 16/252 |

* cited by examiner

MIGRATION OF WEB APPLICATIONS BETWEEN DIFFERENT WEB APPLICATION FRAMEWORKS

FIELD

The field relates generally to information processing, and more particularly to techniques for managing web applications.

BACKGROUND

Web applications, also referred to as web apps, are application programs designed for delivery to users over a network, such as the Internet, through a browser interface. For example, web applications include client server computer programs in which the client runs in a web browser and the web application is hosted in the server. Web applications may include web services and other website components that perform functions for users. Various software frameworks may be used to provide web applications. Such software frameworks, also referred to as web frameworks or web application frameworks, facilitate the building and deployment of web applications. For example, web application frameworks can provide common libraries for various application functions and promote code re-use.

SUMMARY

Illustrative embodiments of the present disclosure provide techniques for migration of web applications between different web application frameworks.

In one embodiment, a method comprises identifying at least a portion of a web application to be migrated from a first web application framework to a second web application framework, the portion of the web application comprising at least a subset of a plurality of page elements of the web application. The method also comprises selecting at least one of the plurality of page elements in the portion of the web application to be migrated from the first web application framework to the second web application framework, generating an application chunk for the selected page element as a self-contained web application that utilizes the second web application framework, and replacing a portion of existing software code of the web application corresponding to the selected page element with chunk definition metadata of the generated application chunk, the chunk definition metadata defining content of the selected page element, dependencies of the selected page element, and one or more triggers for loading the generated application chunk. The method further comprises creating an application core for the web application, the application core comprising a user interface shell configured to load the generated application chunk and one or more other ones of a plurality of application chunks of the web application based at least in part on activation of user interface elements of the web application corresponding to the defined triggers of the generated application chunk. The web application is configured to be executed by running the application core and utilizing the application core to load the plurality of application chunks. The method is performed by at least one processing device comprising a processor coupled to a memory.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
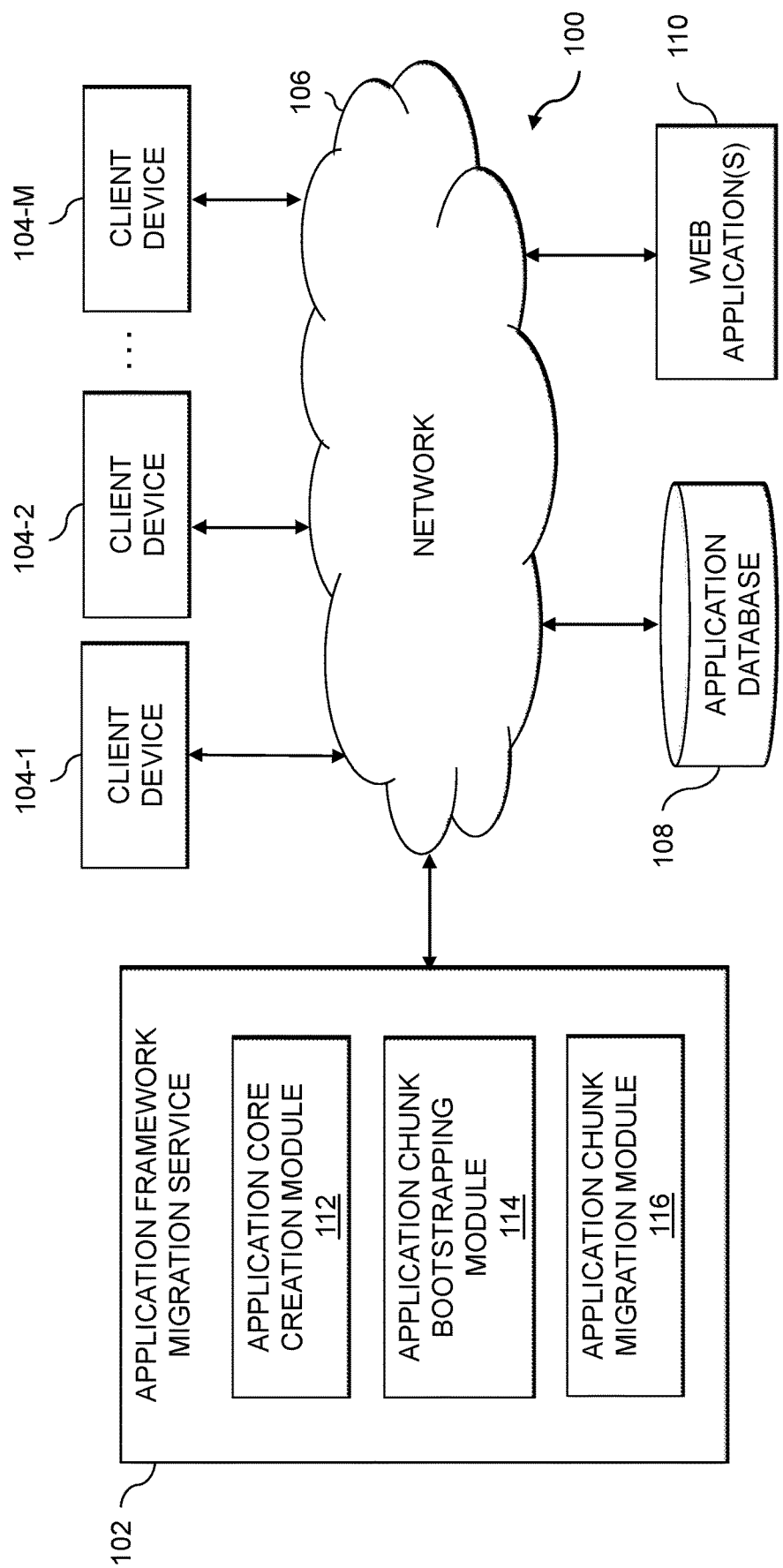
FIG. 1 is a block diagram of an information processing system for migration of web applications between different web application frameworks in an illustrative embodiment.

FIG. 1 shows an information processing system 100 configured in accordance with an illustrative embodiment. The information processing system 100 is assumed to be built on at least one processing platform and provides functionality for migration of web applications between different web application frameworks. It should be understood that "migration" of a given web application between different web application frameworks may include migrating only a portion of the given web application (e.g., one or more "application chunks" thereof as will be described in further detail below). Thus, the given web application may be considered successfully migrated when only a subset of the application chunks or portions of the given web application have been migrated from a first web application framework to a second web application framework. Further, it should be appreciated that different portions of the given web application may be migrated to different web application frameworks. For example, a first portion of the given web application may be migrated from the first web application framework to the second web application framework, while a second portion of the given web application may be migrated from the first web application framework to a third web application framework.

The information processing system 100 includes an application framework migration service 102, which is coupled via a network 106 to a set of web applications 110. The web applications 110 are assumed to be accessed, over network 106, by client devices 104-1, 104-2, ... 104-M (collectively, client devices 104), such as via web browsers running on the client devices. Also coupled to the network 106 is an application database 108, which may store various information relating to the web applications 110 as will be described in further detail below.

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. At least portions of the system 100 may thus be referred to herein as collectively comprising an "enterprise." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The application database 108, as discussed above, is configured to store and record information relating to web applications 110. Such information may include, but is not limited to, different versions of an application (e.g., written for different web application frameworks). The information stored in the application database 108 may also or alternatively include application cores, application chunk bootstrapping code, application chunk definition metadata and other information associated with the web applications 110.

The application database 108 in some embodiments is implemented using one or more storage systems or devices associated with the application framework migration service 102. In some embodiments, one or more of the storage systems utilized to implement the application database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the application framework migration service 102, as well as to support communication between the application framework migration service 102 and other related systems and devices not explicitly shown.

In some embodiments, the client devices 104 may implement host agents that are configured for communication with the application framework migration service 102. The host agents implemented by the client devices 104 may be configured to receive notifications or alerts from the application framework migration service 102, such as when a particular web application or portion thereof (e.g., an "application chunk" as will be described in further detail below) has been migrated from one framework to another. Alerts may also be provided in the event that an application core is forced to fallback to a previous version of a web application (e.g., due to some error with a migrated application chunk, when a portion of a web application has not yet been migrated to a new web application framework, etc.). Such alerts may be provided via the host agents to ones of the client devices 104 that are operated by system administrators, information technology (IT) personnel or other users (e.g., of a software development team) that are responsible for one or more of the web applications 110 including migrating such web applications 110 between web application frameworks. The alerts or notifications may trigger remedial action as desired (e.g., to migrate application chunks, to troubleshoot migration issues, etc.).

It should be noted that a "host agent" as this term is generally used herein may comprise an automated entity, such as a software entity running on a processing device. Accordingly, a security agent or host agent need not be a human entity.

Although shown as separate from the client devices 104 in the FIG. 1 embodiment, it should be appreciated that the application framework migration service 102 may be implemented at least in part within one or more of the client devices 104 in some embodiments.

The application framework migration service 102 in the FIG. 1 embodiment is assumed to be implemented using at least one processing device. Each such processing device generally comprises at least one processor and an associated memory, and implements one or more functional modules for controlling certain features of the application framework migration service 102. In the FIG. 1 embodiment, the application framework migration service 102 implements an application core creation module 112, an application chunk bootstrapping module 114, and an application chunk migration module 116.

The application framework migration service 102 is configured to identify at least a portion of a given one of the web applications 110 that is to be migrated from a first web application framework to a second web application framework. The portion of the given web application is assumed to comprise at least a subset of a plurality of page elements of the given web application. Page elements of a web application may include, but are not limited to, whole pages of a web application, a portion (e.g., a frame or other display area) of a particular page of the web application, a dialog box that is presented by the web application, etc. Such page elements of the web application form different "application chunks" of the web application. In some embodiments, each page element is associated with a different application chunk. In other embodiments, two or more page elements are associated with the same application chunk. In either case, the page element or elements of a particular application chunk handle specific content of the web application. Each application chunk is a self-contained web application that is configured to be executed independent of other application chunks of the given web application (e.g., each application chunk can load all its content and sub-content and dependencies by itself).

The application core creation module 112 is configured to create an application core for the given web application. The application core comprises a user interface shell that is configured to load and un-load application chunks of the given web application based at least in part on activation of user interface elements of the given web application corresponding to defined triggers of the application chunks. The application core creation module 112 is also configured to generate a communication bridge for the application core that is configured (i) to load shared object instances utilized by multiple application chunks and (ii) to enable communication between the application chunks of the given web application.

The application chunk bootstrapping module 114 is configured to generate a bootstrapping process for each of the application chunks of the given web application. The bootstrapping process for a given application chunk is configured to mount the web application framework utilized by the given application chunk, to load the given page element or elements of the given application chunk and to link the given application chunk to the communication bridge. The application chunk bootstrapping module 114 is also configured to define or provide information about the triggers which cause the application core to load and un-load the application chunks. Such triggers include, but are not limited to, navigation to particular uniform resource locators (URLs) of the given web application, selection of user interface features of the given web applications (e.g., clicking buttons, etc.).

The application chunk migration module 116 is configured to select at least one of the plurality of page elements in the portion of the given web application to be migrated from the first web application framework to the second web application framework, and to generate an application chunk for the selected page element as a self-contained web application that utilizes the second web application framework. The application chunk migration module 116 is also configured to replace a portion of existing software code of the given web application corresponding to the selected page element with chunk definition metadata of the generated application chunk. The chunk definition metadata defines content of the selected page element, dependencies of the selected page element, and one or more triggers for loading and un-loading the generated application chunk. The given web application is configured to be executed by running the application core created by the application core creation module 112 and utilizing the application core and the bootstrapping processes defined by the application chunk bootstrapping module 114 to load and un-load the application chunks of the given web application (e.g., including application chunks that have been migrated from the first web application framework to the second web application framework utilizing the application chunk migration module 116).

It is to be appreciated that the particular arrangement of the application framework migration service 102, the application core creation module 112, the application chunk bootstrapping module 114 and the application chunk migration module 116 illustrated in the FIG. 1 embodiment is presented by way of example only, and alternative arrangements can be used in other embodiments. As discussed above, for example, the application framework migration service 102, the application core creation module 112, the application chunk bootstrapping module 114 and the application chunk migration module 116 may in some embodiments be implemented internal to one or more of the client devices 104. As another example, the functionality associated with the application core creation module 112, the application chunk bootstrapping module 114 and the application chunk migration module 116 may be combined into one module, or separated across more than three modules with the multiple modules possibly being implemented with multiple distinct processors or processing devices.

At least portions of the application core creation module 112, the application chunk bootstrapping module 114 and the application chunk migration module 116 may be implemented at least in part in the form of software that is stored in memory and executed by a processor.

It is to be understood that the particular set of elements shown in FIG. 1 for migration of web applications between different web application frameworks is presented by way of illustrative example only, and in other embodiments additional or alternative elements may be used. Thus, another embodiment may include additional or alternative systems, devices and other network entities, as well as different arrangements of modules and other components.

The application framework migration service 102 and other portions of the system 100 may be part of cloud infrastructure as will be described in further detail below. The cloud infrastructure hosting the application framework migration service 102 may also host one or more of the web applications 110.

The application framework migration service 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, memory, storage and network resources.

The application framework migration service 102, client devices 104, application database 108 and web applications 110 or components thereof may be implemented on respective distinct processing platforms, although numerous other arrangements are possible. For example, in some embodiments at least portions of the application framework migration service 102 and one or more of the web applications 110 are implemented on the same processing platform. A given one of the web applications 110 can therefore be implemented at least in part within at least one processing platform that implements at least a portion of the application framework migration service 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the application framework migration service 102, client devices 104, application database 108 and web applications 110, or portions or components thereof, to reside in different data centers. Numerous other distributed implementations are possible. The application framework migration service 102 or portions thereof can also be implemented in a distributed manner across multiple data centers.

Additional examples of processing platforms utilized to implement the application framework migration service 102 and other portions of the system 100 in illustrative embodiments will be described in more detail below in conjunction with FIGS. 5 and 6.

It is to be appreciated that these and other features of illustrative embodiments are presented by way of example only, and should not be construed as limiting in any way.

Figure 2:
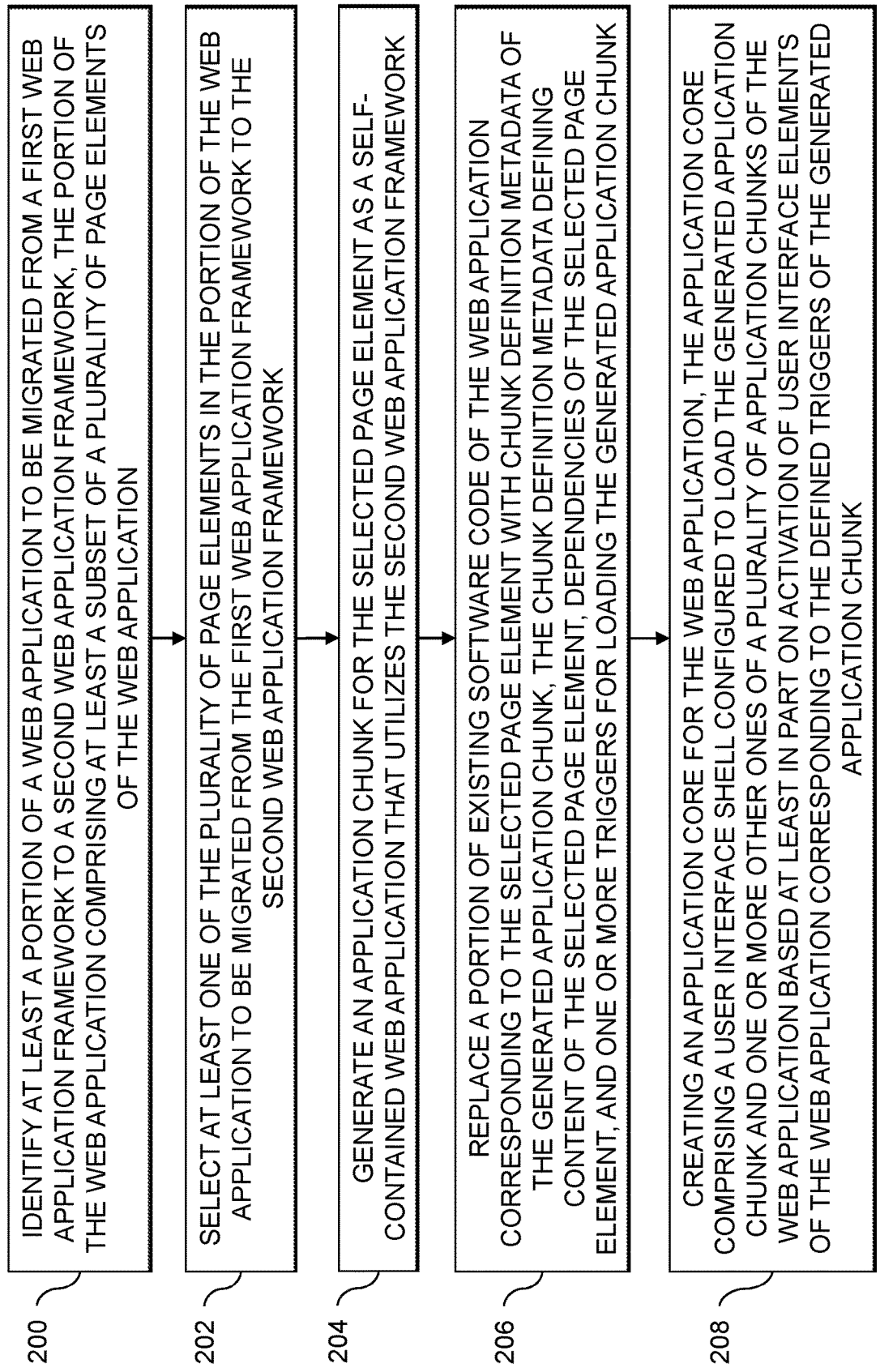
FIG. 2 is a flow diagram of an exemplary process for migration of web applications between different web application frameworks in an illustrative embodiment.

An exemplary process for migration of web applications between different web application frameworks will now be described in more detail with reference to the flow diagram of FIG. 2. It is to be understood that this particular process is only an example, and that additional or alternative processes for migration of web applications between different web application frameworks may be used in other embodiments.

In this embodiment, the process includes steps 200 through 208. These steps are assumed to be performed by the application framework migration service 102 utilizing the application core creation module 112, the application chunk bootstrapping module 114 and the application chunk migration module 116. The process begins with step 200, identifying at least a portion of a web application to be migrated from a first web application framework to a second web application framework, the portion of the web application comprising at least a subset of a plurality of page elements of the web application. In some embodiments, the first and second web application frameworks are different versions of the same web application framework (e.g., an earlier version of a given web application framework and an updated version of the given web application framework). In other embodiments, the first and second web application frameworks are different web application frameworks altogether.

In step 202, at least one of the plurality of page elements in the identified portion of the web application to be migrated from the first web application framework to the second web application framework is selected. Next, an application chunk for the selected page element is generated in step 204 as a self-contained web application that utilizes the second web application framework. A portion of existing software code of the web application corresponding to the selected page element is then replaced in step 206 with chunk definition metadata of the generated application chunk. The chunk definition metadata defines content of the selected page element, dependencies of the selected page element, and one or more triggers for loading and un-loading the generated application chunk. Steps 202 through 206 may be repeated as necessary or desired for additional ones of the page elements in the portion of the web application that are to be migrated from the first web application framework to the second web application framework. In some embodiments, the identified portion in step 200 is the entirety of the web application such that steps 202 through 206 are repeated until all of the page elements of the web application have been converted to application chunks and migrated accordingly to the second web application framework. Steps 202 through 206 may also be repeated for one or more additional ones of the page elements in an additional portion of the web application to be migrated from the first web application framework to a third web application framework different than the second web application framework. It should be appreciated that various different portions of the web application may be migrated from the first web application framework to any desired number of different web application framework utilizing the techniques described herein. The self-contained web application of the generated application chunk is configured for execution independent of additional self-contained web applications for additional ones of the plurality of application chunks.

In step 208, an application core is created for the web application. The application core comprises a user interface (UI) shell configured to load and un-load the application chunk generated in step 204 and one or more other ones of a plurality of application chunks (e.g., which may be generated by repeating step 204 as described above) of the web application. Loading and un-loading the plurality of application chunks is based at least in part on activation of UI elements of the web application corresponding to the defined triggers of the plurality of application chunks. The web application is configured to be executed by running the application core and utilizing the application core to load and un-load the plurality of application chunks. In some embodiments, the application core is its own self-contained web application that utilizes one of the first web application framework and the second web application framework. In other embodiments, the application core is its own self-contained web application that utilizes a third web application framework different than both the first and second web application frameworks.

In some embodiments, step 208 includes generating a communication bridge configured (i) to load shared object instances utilized by two or more of the plurality of application chunks and (ii) to enable communication between the plurality of application chunks. Step 208 may further include generating a bootstrapping process for each of the plurality of application chunks, the bootstrapping process for the generated application chunk being configured to mount the second web application framework, to load the selected page element of the generated application chunk, and to link the generated application chunk to the communication bridge.

Running the application core may comprise, at startup of the web application, displaying a user interface shell, reading application chunk definition metadata to identify a set of available ones of the plurality of application chunks, and monitoring user interface features of the web application to determine when respective ones of the plurality of page elements of the web application are selected. Responsive to determining that a given page element of the web application is selected, the application core identifies at least one of the plurality of application chunks to be loaded or un-loaded from the user interface shell. Responsive to identifying at least one application chunk to be un-loaded from the user interface shell, the application core disables said at least one application chunk. Disabling said at least one application chunk may comprise maintaining said at least one application chunk in an application chunk buffer of the memory of the processing device. Responsive to identifying at least one application chunk to be loaded into the user interface shell, the application core reads chunk definition metadata for said at least one application chunk, injects one or more application chunk files and dependencies for said at least one application chunk specified in the chunk definition metadata, boot-straps one or more page elements of said at least one application chunk into an associated self-contained web application for said at least one application chunk, and links the self-contained web application for said at least one application chunk to a communication bridge of the application core. The communication bridge is configured (i) to load shared object instances utilized by said at least one application chunk and (ii) to enable communication between said at least one application chunk and one or more other ones of the plurality of application chunks.

When a web application needs to be migrated from one web application framework (e.g., a core or visual framework) to another, a complete re-write of the web application (e.g., at least those portions of the web application using the previous web application framework) is required. This is caused by both the dependencies between the different parts of the web application and the need to keep a global common user experience (UX) at all times.

Illustrative embodiments provide techniques for migration of web applications between different web application frameworks that may be used to incrementally update existing web applications to different web application frameworks. Advantageously, the techniques described herein are non-disruptive, both at the development level and the UX level, allowing continuous releases of a given web application while the given web application is being migrated from a first web application framework to a second web application framework. This allows for parallel updates to be performed, bringing added value to end-users at the same time. While various embodiments are described herein in the context of Software-as-a-Service (SaaS) solutions, the techniques described herein are not limited to the SaaS context and may instead be used on any type of web application.

A web application may have a lifecycle that spans across a wide time period. In such cases, the web application frameworks that the web application relies upon can become deprecated, obsolete or evolve in ways that are not backward compatible. In some cases, the web application framework used by a given web application may lack certain features that other web application frameworks provide. Any major framework migration of a web application (e.g., migrating from JQuery to React, or migrating from one user interface (UI) framework to another) requires a tremendous amount of time and work. Sometimes, an old or previous application is dropped entirely, with a new web application being created from scratch. This can be very detrimental to a SaaS solution as during that time, the end-users do not receive any meaningful updates or, if they do, the work has to be performed twice (e.g., once for the old or previous web application and another time for the newly developed web application). Re-writing the web application from scratch, in addition to being time consuming, is also error-prone. A web application may take months to re-write, needs to be entirely retested at once, etc. During such time, no or minimal updates can be provided to end users.

Some web application frameworks provide tools for major upgrades (e.g., from the AngularJS framework to the Angular framework). Such tools, however, often have strict requirements on the code initially written and may require re-writes of some portions of the old or existing code before such code can be of use. Also, such tools are usually designed for use within only a single web application framework (e.g., for major non-backward compatible upgrades) and cannot handle migration to an entirely different web application framework. Illustrative embodiments enable framework-independent migration of a web application without the need to re-write any existing content of the web application.

In some cases, hybrid applications are used, where two single-page web applications simultaneously try to handle the whole page content. In this case, the web application frameworks of both pages each take control of the whole page and may conflict with each other, creating race conditions in URL event handlers and other conflicting issues that are especially difficult to debug when they occur as they usually do. Further, such hybrid applications can significantly delay loading times as more web application frameworks need to be loaded upfront. Also, hybrid applications may enforce a specific build process and content delivery, while the techniques described herein do not. Illustrative embodiments restrict application chunks to their own containers or page elements, although the application chunks are still configured to listen to some global events such as URL updates, but for their own internal sub-routing, thus limiting the potential clashes between different web application frameworks.

In illustrative embodiments, the application framework migration service 102 is used to split a web application into "application chunks" (e.g., of small to medium size relative to a total size of the web application) and allow such application chunks to be migrated (e.g., one by one) without impacting other application chunks in any way. While some software development teams and resources can be working on update of a given application chunk, other software development teams and resources can continue to deliver updates to other, "untouched" application chunks of the web application. Such untouched application chunks may include application chunks that have not yet been migrated to a new web application framework (e.g., including in cases where a particular application chunk will not be migrated to the new web application framework), application chunks already migrated to the new web application framework, etc. The application framework migration service articulates around on a few central points that define, organize and handle these application chunks.

Each application chunk is assumed to be responsible for handling a specific part of a web application (e.g., a specific part of a page of the web application also referred to herein as a page element). For example, a given application chunk may handle the main content of the web application and interact with other application chunks, components and services of the web application. Although a given application chunk is able to interact with other application chunks components and services of the web application, the given application chunk does not manage anything outside its own page element. A page element, also referred to as a HyperText Markup Language (HTML) element or HTML container, refers to a location in a page that will load content.

Figure 3:
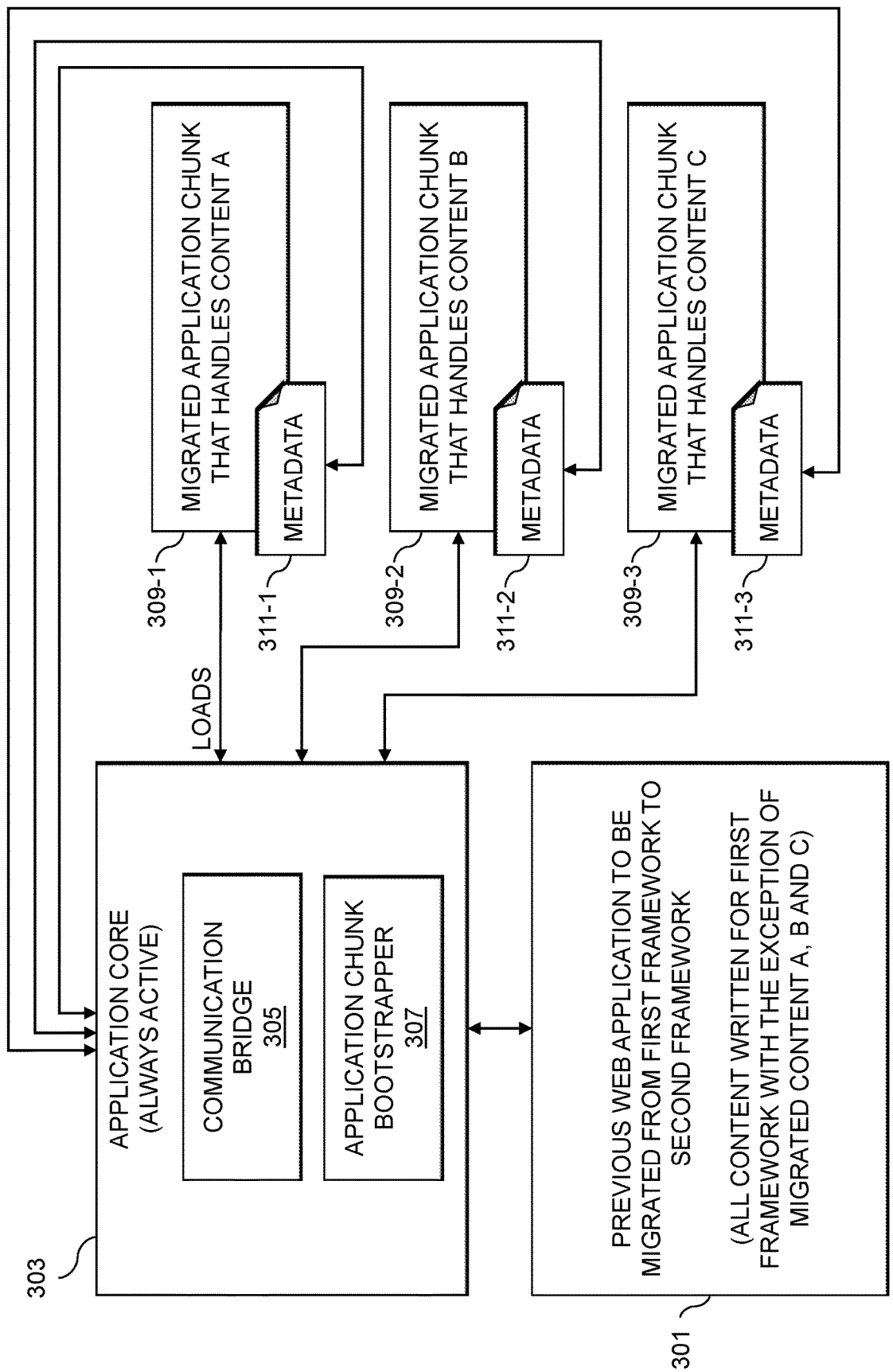
FIG. 3 shows an application core of a web application loading application chunks in an illustrative embodiment.

The application framework migration service 102 separates a web application into different parts. FIG. 3 shows an example of such different parts or components, including a "previous" web application 301 that is to be migrated from a first web application framework to a second web application framework. The previous web application 301 may be used as a fallback by an application core 303, such as when migrated application chunks fail to load correctly or for content of the web application that has not yet been migrated (or will not be migrated) to the second web application framework.

The application core 303 provides a core part of the web application responsible for managing the different application chunks of the web application and loading such web application chunks on an as-needed basis (e.g., based on user interaction or selection in a running instance of the web application) in order to display the content of the page elements provided by the application chunks. In the FIG. 3 example, it is assumed that content A, B and C of the previous web application 301 have been migrated as application chunks 309-1, 309-2 and 309-3 (collectively, application chunks 309) to the second web application framework. The application core 303 loads such migrated application chunks 309 as needed. The application core 303 does not include web application content or views. The particular web application framework used to implement the application core 303 is independent of the web application framework used for any particular application chunk of the web application. In some embodiments, the application core 303 does not rely on any web application framework. While the application core 303 may rely on a particular web application framework, it is not necessary. The application core 303 is standalone, in that the application core 303 does not need other pieces (e.g., any of the application chunks) to function. The application core 303 may not display much itself (e.g., it may only provide a "shell" in accordance with an application shell architecture where the application shell provides a static rendered page that loads quickly).

Each of the migrated application chunks 309 has a chunk definition, which is metadata 311-1, 311-2 and 311-3 (collectively, chunk definition metadata 311) defining that application chunk, what the application chunk depends on, and what should trigger activation of that application chunk. The chunk definition metadata 311 can also include various other details that are of use to the application core 303 as described above and elsewhere herein. The chunk definition metadata 311 illustratively relies on configuration information, not code.

The migrated application chunks 309 are also associated with respective application chunk content. The chunk content for a given application chunk is actual, self-contained, standalone content that will be loaded by the given application chunk. In some embodiments, each application chunk is a "small" self-contained web application that is responsible for handling specific content (e.g., a specific page of a larger web application having multiple pages, a specific page element of a larger page of the web application, a dialog box of a page of the web application, etc.). For performance reasons, it is desired in some embodiments to keep the chunk content as small as possible. The chunk content, however, needs to contain, or be able to load by itself, all its associated dependencies or sub-content.

In some embodiments, the application core 303 provides or utilizes a communication bridge 305. The communication bridge 305 for a web application is a shared object instance used to help with the migration of the web application by re-using existing functionalities from migrated application chunks 309, as a means for sharing data and communication between migrated application chunks 309 if needed, combinations thereof, etc. For example, the communication bridge 305 may provide shared framework-agnostic libraries and styles across the migrated application chunks 309 (e.g., a shared library for displaying charts, etc.). This advantageously avoids duplication of libraries and style information used by multiple migrated application chunks 309. The communication bridge 305 may be implemented or rely on shared objects and application programming interfaces (APIs). The APIs of the communication bridge 305 provide information about what the communication bridge 305 is expected to contain, in terms of methods, utilities, etc. The communication bridge 305 itself may be a class or regular object that is created by the application core 303 (which can then select a specific implementation), and is then shared with all application chunks as they get loaded into the web application. The communication bridge 305 in some embodiments provides a "global" API, in that the application core 303 implements the communication bridge 305 and provides or makes it accessible to all application chunks of the web application.

It should be noted that, in some embodiments, how the chunk definition metadata 311 and chunk content are provided does not impact the application framework migration process. The chunk definition metadata 311 and chunk content could be bundled once at build time, or provided on-demand at runtime. The chunk definition metadata 311 and/or chunk content can also be adapted to an existing or previous instance of the web application 301 to limit the amount of work on computing resources required.

To migrate a given web application (e.g., previous web application 301) from a first web application framework to a second web application framework, the first step is to create and set the application core 303. The given web application may rely on any web application framework of choice, no web application framework, or a framework of the given web application itself. At this step, triggers are defined, where the triggers are used by the application core 303 to load the application chunks of the given web application. In some embodiments, URLs are utilized for the triggers, though embodiments are not limited solely to use with URLs as triggers. In other embodiments, other types of UI interactions, such as clicking on buttons or otherwise selecting UI features may be used as triggers for loading application chunks of the given web application.

The application core 303 is what is first loaded when the web application is loaded. The application core 303 then decides which application chunks to load based on the defined triggers and a current state of the web application. The application chunks are loaded on the page directly, potentially along with other application chunks. The different application chunks, in some cases, are able to interact with one another. The different application chunks, however, are loaded each in its own execution context. The application core 303 will shut down or un-load application chunks and load other application chunks as needed (e.g., based on user interaction with defined triggers of the web application).

The next step, after creating and setting the application core 303, is to generate a bootstrapping process (e.g., application chunk bootstrapper 307) for each self-contained application chunk of the given web application based on the new selected web application framework (e.g., the web application framework that the given web application is being migrated to). This step also includes generation of the communication bridge 305. As each application chunk is self-contained, the application chunks all contain the web application framework they rely upon. The application core 303, via the application chunk bootstrapper 307, is able to mount the required web application framework anywhere and launch the corresponding self-contained application chunk as needed. The application core 303 is also able to shut down the self-contained application chunks when needed.

The application core 303 defines the schema (e.g., the kind of information that application chunks can provide for loading and un-loading purposes). Each application chunk then provides its own definition to the application core 303 during a registration process. The registration process allows application chunks to be registered with the application core 303. The registration process may include loading the application core 303, and the application core 303 fetching metadata for available application chunks. The application core 303 registers each application chunk based on its provided metadata, which as described above may include triggers for loading and un-loading the application chunks response to activation of user interface features of the web application. The web application then starts, and the application core 303 begins to load and un-load the application chunks as necessary based on the registered triggers.

In some embodiments, an implementation of the above works as follows. The application core 303 watches the browser URL to decide what application chunks to load and un-load. At startup, the application core 303 can display a UI shell and read metadata 311 to learn about available application chunks 309. The metadata 311, in some embodiments, is stored using JavaScript Objection Notation (JSON) format. When the URL changes (e.g., when a user navigates to a different portion of the web application), the application core 303 un-loads disabled application chunks. In some embodiments, the disabled application chunks are kept in memory for faster reload. To lower memory usage, the disabled application chunks may be dropped from memory (e.g., when a buffer for disabled chunks is full, one or more disabled chunks being held in memory may be flushed or evicted). The application core 303, on detecting that the URL has changed, will also load any new application chunks that are required. For each new application chunk to be loaded, the application core 303 will inject the appropriate application chunk files and dependencies, create or find a dedicated page element for that application chunk, bootstrap the self-contained application chunk into the page element (e.g., using application chunk bootstrapper 307), and link the communication bridge 305 to the self-contained application chunk.

Figure 4:
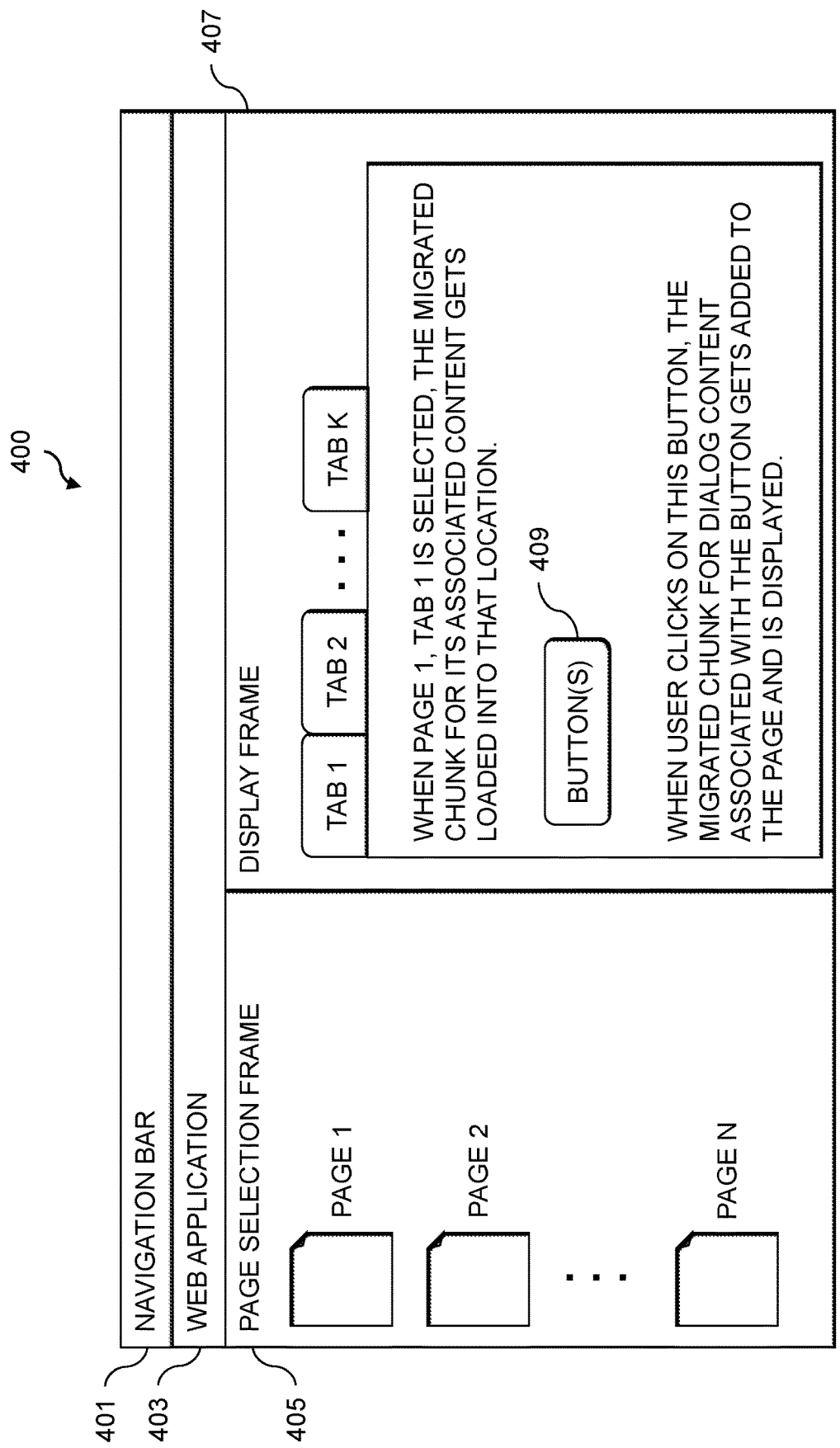
FIG. 4 illustrates a view of different portions of a web application in an illustrative embodiment.

The migration process can proceed as follows. First, an application chunk is selected to migrate. FIG. 4 shows an example layout 400, including various portions or page elements thereof. The web application 403 includes a navigation bar 401, which may be a portion of a web browser that is utilized to type in or otherwise input URLs to load web application 403. The web application 403 also includes a page selection frame 405, allowing a user to select from pages 1, 2, . . . N to present in the display frame 407. The display frame 407 as shown includes a set of tabs 1, 2, . . . K. When a particular page and tab are selected (e.g., page 1, tab 1) the migrated application chunk 309 for its associated content gets loaded into the display frame 407. The display frame 407 may further display one or more buttons 409 or other UI features. When the user clicks on the buttons 409, the migrated application chunk for dialog content associated with the selected button gets added to the selected page and is displayed.

The page selection frame 405, display frame 407, and tabs shown in FIG. 4 are examples of application chunks representing specific pages or page elements of web application 403. As described above, a selected application chunk may be a specific page of the web application 403 located at a specific URL input to the navigation bar 401, a part of the page such as page selection frame 405 or display frame 407, a specific dialog box triggered on a specific user action such as clicking on one of the buttons 409 or otherwise actuating a UI feature, etc.

Application chunks may vary in size, and the application framework migration service 102 may adjust the application chunk size based on available time, resources and commitments. To migrate a selected application check, a new application chunk is created in the new web application framework. It should be appreciated that, in this context, the "new" application framework refers to the web application framework that the selected application chunk is being migrated to. In some cases, however, the new web application framework may actually be "older" than the "previous" web application framework that the selected application chunk is being migrated from. For example, it may be desired to migrate the selected application chunk to an older version of a particular web application framework, or to an earlier-developed web application framework of a different type that provides certain desired functionality.

The new application chunk is illustratively a self-contained application chunk. The selected or old application chunk that is to be migrated may not be a self-contained application chunk, as the web application being migrated may be a legacy application not previously designed with an application core and self-contained application chunks as described above. The corresponding code for the selected application chunk is removed from the existing web application and replaced with the chunk definition of the newly created self-contained application chunk. The whole web application may be built using the newly created self-contained application chunk, and deployed and released as needed or desired. At this point, the web application is partially migrated.

The above process may be repeated for additional application chunks to fully migrate the web application. In some cases, once the web application is fully migrated, some or all of the application chunks may be re-combined (e.g., for performance reasons depending on how such application chunks were initially created, etc.). It should be appreciated, however, that not all portions of the web application need be migrated. In some cases, it is desired to migrate only a subset of the application chunks of the web application to the new web application framework. The migration process may also be "paused" if needed to redirect resources to other pressing matters, such as patching vulnerabilities in the web application, before continuing migration of application chunks of the web application to the new web application framework.

It is also possible to migrate different application chunks of the web application to distinct web application frameworks. For example, a first set of application chunks of the web application may be migrated from a first web application framework to a second web application framework, while a second set of application chunks of the application are migrated from the first web application framework to a third web application framework with both the second and third web application frameworks being different than the first web application framework.

Illustrative embodiments provide techniques for migrating web applications between different web application frameworks. Advantageously, the techniques described herein allow a web application to be migrated in pieces (e.g., as application chunks), such that the work and effort may be spread out and the migration may be seamless from the perspective of the end-users of the web application. In addition, such different pieces may be upgraded or updated individually allowing continuous releases while the web application migration is being worked on. Also, parallel updates of different pieces of the application may be performed.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for migrating web applications between different web application frameworks will now be described in greater detail with reference to FIGS. 5 and 6. Although described in the context of system 100, these platforms may also be used to implement at least portions of other information processing systems in other embodiments.

Figure 5:
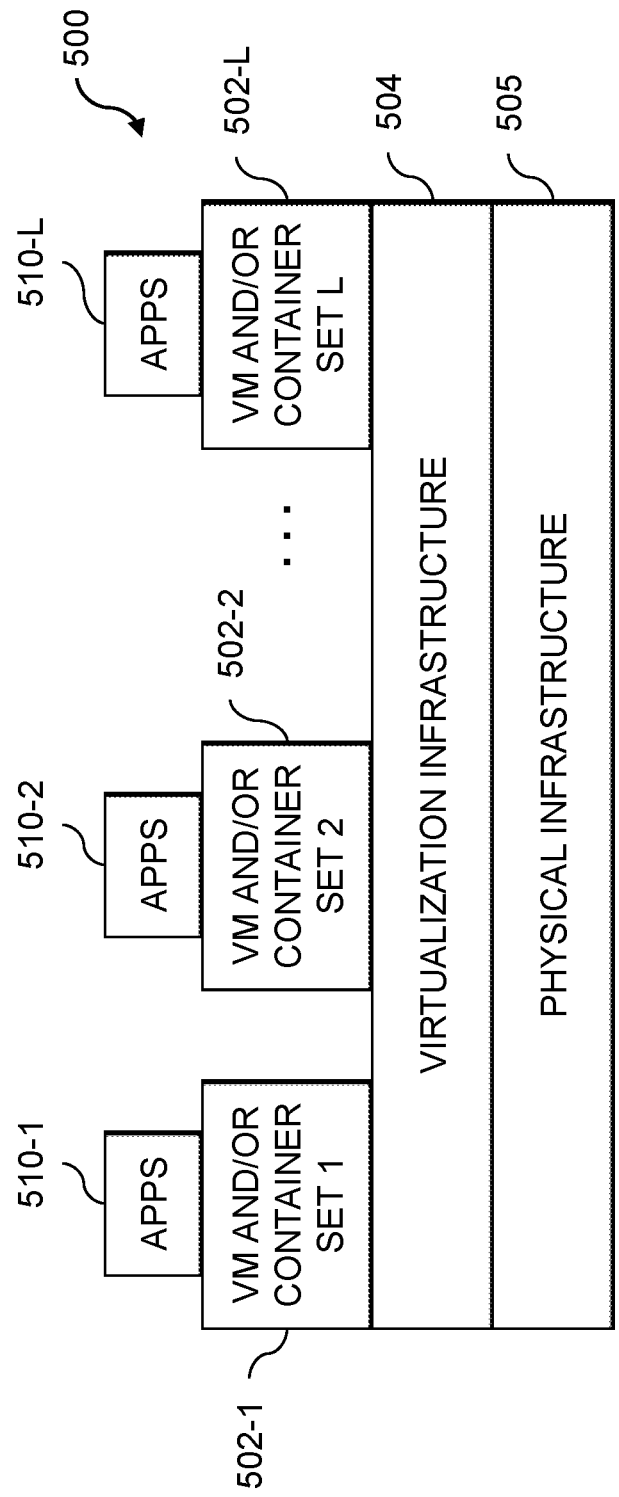
FIGS. 5 and 6 show examples of processing platforms that may be utilized to implement at least a portion of an information processing system in illustrative embodiments.
Figure 6:
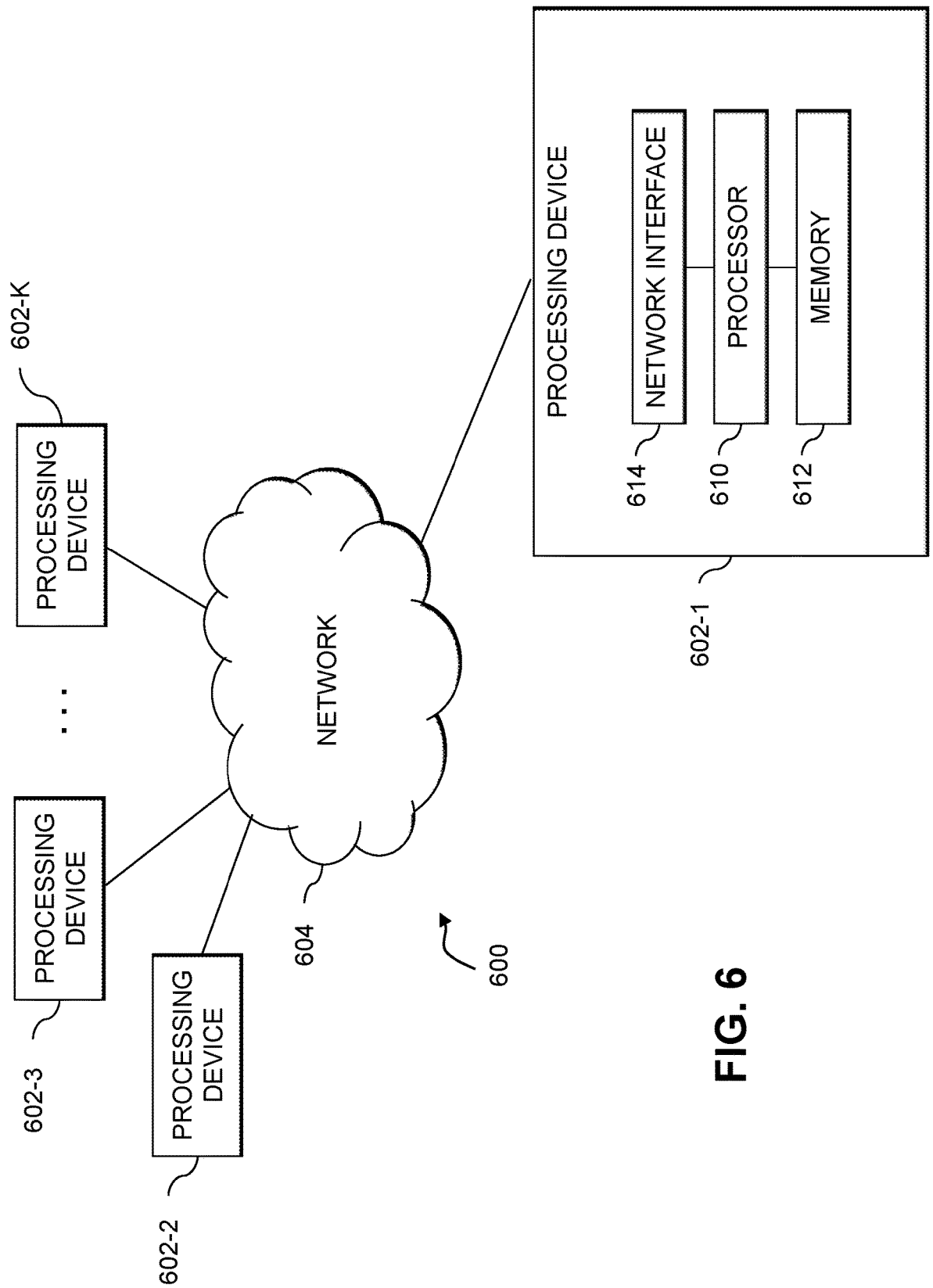

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for migrating web applications between different web application frameworks as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, web application frameworks, page elements, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising steps of:
identifying at least a portion of a web application to be migrated from a first web application framework to a second web application framework, the portion of the web application comprising at least a subset of a plurality of page elements of the web application;

selecting at least one of the plurality of page elements in the portion of the web application to be migrated from the first web application framework to the second web application framework;

generating an application chunk for the selected page element as a self-contained web application that utilizes the second web application framework;

replacing a portion of existing software code of the web application corresponding to the selected page element with chunk definition metadata of the generated application chunk, the chunk definition metadata defining content of the selected page element, dependencies of the selected page element, and one or more triggers for loading the generated application chunk; and creating an application core for the web application, the application core comprising a user interface shell configured to load the generated application chunk that utilizes the second web application framework and one or more other ones of a plurality of application chunks of the web application that utilize one or more web application frameworks other than the second web application framework based at least in part on activation of user interface elements of the web application corresponding to the defined triggers of the generated application chunk;

wherein the web application is configured to be executed by running the application core and utilizing the application core to load the plurality of application chunks;

wherein creating the application core for the web application further comprises:

generating a communication bridge configured (i) to load shared object instances utilized by two or more of the plurality of application chunks and (ii) to enable communication between the plurality of application chunks; and generating a bootstrapping process for each of the plurality of application chunks, the bootstrapping process for the generated application chunk being configured to mount the second web application framework, to load the selected page element of the generated application chunk, and to link the generated application chunk to the communication bridge; and wherein the method is performed by at least one processing device comprising a processor coupled to a memory.

2. The method of claim 1 further comprising repeating the selecting, generating and replacing steps for one or more additional ones of the page elements in the portion of the web application.

3. The method of claim 1 wherein identifying the portion of the web application to be migrated from the first web application framework to the second web application framework comprises identifying an entirety of the web application.

4. The method of claim 1 further comprising repeating the selecting, generating and replacing steps for one or more additional ones of the page elements in an additional portion of the web application to be migrated from the first web application framework to a third web application framework different than the second web application framework.

5. The method of claim 1 wherein the first web application framework comprises a first version of a given web application framework and the second web application framework comprises a second version of the given web application framework.

6. The method of claim 1 wherein the application core comprises a self-contained web application that utilizes one of the first web application framework and the second web application framework.

7. The method of claim 1 wherein the application core comprises a self-contained web application that utilizes a third web application framework different than the first web application framework and the second web application framework.

8. The method of claim 1 wherein the self-contained web application of the generated application chunk is configured for execution independent of additional self-contained web applications for additional ones of the plurality of application chunks.

9. The method of claim 1 wherein running the application core comprises:

at startup of the web application, displaying a user interface shell;

reading application chunk definition metadata to identify a set of available ones of the plurality of application chunks; and monitoring user interface features of the web application to determine when respective ones of the plurality of page elements of the web application are selected.

10. The method of claim 9 further comprising, responsive to determining that a given page element of the web application is selected, identifying at least one of the plurality of application chunks to be loaded or un-loaded from the user interface shell.

11. The method of claim 10 further comprising, responsive to identifying at least one application chunk to be un-loaded from the user interface shell, disabling said at least one application chunk.

12. A method comprising steps of:

identifying at least a portion of a web application to be migrated from a first web application framework to a second web application framework, the portion of the web application comprising at least a subset of a plurality of page elements of the web application;

selecting at least one of the plurality of page elements in the portion of the web application to be migrated from the first web application framework to the second web application framework;

generating an application chunk for the selected page element as a self-contained web application that utilizes the second web application framework;

replacing a portion of existing software code of the web application corresponding to the selected page element with chunk definition metadata of the generated application chunk, the chunk definition metadata defining content of the selected page element, dependencies of the selected page element, and one or more triggers for loading the generated application chunk; and creating an application core for the web application, the application core comprising a user interface shell configured to load the generated application chunk that utilizes the second web application framework and one or more other ones of a plurality of application chunks of the web application that utilize one or more web application frameworks other than the second web application framework based at least in part on activation of user interface elements of the web application corresponding to the defined triggers of the generated application chunk;

wherein the web application is configured to be executed by running the application core and utilizing the application core to load the plurality of application chunks;
wherein the method is performed by at least one processing device comprising a processor coupled to a memory;
wherein running the application core comprises:
  at startup of the web application, displaying a user interface shell;
  reading application chunk definition metadata to identify a set of available ones of the plurality of application chunks;
  monitoring user interface features of the web application to determine when respective ones of the plurality of page elements of the web application are selected;
  responsive to determining that a given page element of the web application is selected, identifying at least one of the plurality of application chunks to be loaded or un-loaded from the user interface shell; and
  responsive to identifying at least one application chunk to be un-loaded from the user interface shell, disabling said at least one application chunk;
wherein disabling said at least one application chunk comprises maintaining said at least one application chunk in an application chunk buffer of the memory of the at least one processing device.

13. A method comprising steps of:
identifying at least a portion of a web application to be migrated from a first web application framework to a second web application framework, the portion of the web application comprising at least a subset of a plurality of page elements of the web application;
selecting at least one of the plurality of page elements in the portion of the web application to be migrated from the first web application framework to the second web application framework;
generating an application chunk for the selected page element as a self-contained web application that utilizes the second web application framework;
replacing a portion of existing software code of the web application corresponding to the selected page element with chunk definition metadata of the generated application chunk, the chunk definition metadata defining content of the selected page element, dependencies of the selected page element, and one or more triggers for loading the generated application chunk; and
creating an application core for the web application, the application core comprising a user interface shell configured to load the generated application chunk that utilizes the second web application framework and one or more other ones of a plurality of application chunks of the web application that utilize one or more web application frameworks other than the second web application framework based at least in part on activation of user interface elements of the web application corresponding to the defined triggers of the generated application chunk;
wherein the web application is configured to be executed by running the application core and utilizing the application core to load the plurality of application chunks;
wherein running the application core comprises:
  at startup of the web application, displaying a user interface shell;
  reading application chunk definition metadata to identify a set of available ones of the plurality of application chunks;
  monitoring user interface features of the web application to determine when respective ones of the plurality of page elements of the web application are selected; and
  responsive to identifying at least one application chunk to be loaded into the user interface shell:
    reading chunk definition metadata for said at least one application chunk;
    injecting one or more application chunk files and dependencies for said at least one application chunk specified in the chunk definition metadata;
    boot-strapping one or more page elements of said at least one application chunk into an associated self-contained web application for said at least one application chunk; and
    linking the self-contained web application for said at least one application chunk to a communication bridge of the application core, the communication bridge being configured (i) to load shared object instances utilized by said at least one application chunk and (ii) to enable communication between said at least one application chunk and one or more other ones of the plurality of application chunks; and
  wherein the method is performed by at least one processing device comprising a processor coupled to a memory.

14. A computer program product comprising a non-transitory processor-readable storage medium having stored therein program code of one or more software programs, wherein the program code when executed by at least one processing device causes the at least one processing device to perform steps of:
identifying at least a portion of a web application to be migrated from a first web application framework to a second web application framework, the portion of the web application comprising at least a subset of a plurality of page elements of the web application;
selecting at least one of the plurality of page elements in the portion of the web application to be migrated from the first web application framework to the second web application framework;
generating an application chunk for the selected page element as a self-contained web application that utilizes the second web application framework;
replacing a portion of existing software code of the web application corresponding to the selected page element with chunk definition metadata of the generated application chunk, the chunk definition metadata defining content of the selected page element, dependencies of the selected page element, and one or more triggers for loading the generated application chunk; and
creating an application core for the web application, the application core comprising a user interface shell configured to load the generated application chunk that utilizes the second web application framework and one or more other ones of a plurality of application chunks of the web application that utilize one or more web application frameworks other than the second web application framework based at least in part on activation of user interface elements of the web application corresponding to the defined triggers of the generated application chunk;

wherein the web application is configured to be executed by running the application core and utilizing the application core to load the plurality of application chunks; and wherein creating the application core for the web application further comprises:
  generating a communication bridge configured (i) to load shared object instances utilized by two or more of the plurality of application chunks and (ii) to enable communication between the plurality of application chunks; and
  generating a bootstrapping process for each of the plurality of application chunks, the bootstrapping process for the generated application chunk being configured to mount the second web application framework, to load the selected page element of the generated application chunk, and to link the generated application chunk to the communication bridge.

15. The computer program product of claim 14 wherein the self-contained web application of the generated application chunk is configured for execution independent of additional self-contained web applications for additional ones of the plurality of application chunks.

16. The computer program product of claim 14 wherein running the application core comprises:
  at startup of the web application, displaying a user interface shell;
  reading application chunk definition metadata to identify a set of available ones of the plurality of application chunks;
  monitoring user interface features of the web application to determine when respective ones of the plurality of page elements of the web application are selected;
  responsive to determining that a given page element of the web application is selected, identifying at least one of the plurality of application chunks to be loaded or un-loaded from the user interface shell; and
  responsive to identifying at least one application chunk to be un-loaded from the user interface shell, disabling said at least one application chunk; and
  wherein disabling said at least one application chunk comprises maintaining said at least one application chunk in an application chunk buffer of a memory of the at least one processing device.

17. An apparatus comprising:
  at least one processing device comprising a processor coupled to a memory;
  the at least one processing device being configured to perform steps of:
    identifying at least a portion of a web application to be migrated from a first web application framework to a second web application framework, the portion of the web application comprising at least a subset of a plurality of page elements of the web application;
    selecting at least one of the plurality of page elements in the portion of the web application to be migrated from the first web application framework to the second web application framework;
    generating an application chunk for the selected page element as a self-contained web application that utilizes the second web application framework;
    replacing a portion of existing software code of the web application corresponding to the selected page element with chunk definition metadata of the generated application chunk, the chunk definition metadata defining content of the selected page element, dependencies of the selected page element, and one or more triggers for loading the generated application chunk; and
    creating an application core for the web application, the application core comprising a user interface shell configured to load the generated application chunk that utilizes the second web application framework and one or more other ones of a plurality of application chunks of the web application that utilize one or more web application frameworks other than the second web application framework based at least in part on activation of user interface elements of the web application corresponding to the defined triggers of the generated application chunk;

wherein the web application is configured to be executed by running the application core and utilizing the application core to load the plurality of application chunks; and wherein creating the application core for the web application further comprises:
  generating a communication bridge configured (i) to load shared object instances utilized by two or more of the plurality of application chunks and (ii) to enable communication between the plurality of application chunks; and
  generating a bootstrapping process for each of the plurality of application chunks, the bootstrapping process for the generated application chunk being configured to mount the second web application framework, to load the selected page element of the generated application chunk, and to link the generated application chunk to the communication bridge.

18. The apparatus of claim 17 wherein the self-contained web application of the generated application chunk is configured for execution independent of additional self-contained web applications for additional ones of the plurality of application chunks.

19. The apparatus of claim 17 wherein running the application core comprises:
  at startup of the web application, displaying a user interface shell;
  reading application chunk definition metadata to identify a set of available ones of the plurality of application chunks;
  monitoring user interface features of the web application to determine when respective ones of the plurality of page elements of the web application are selected;
  responsive to determining that a given page element of the web application is selected, identifying at least one of the plurality of application chunks to be loaded or un-loaded from the user interface shell; and
  responsive to identifying at least one application chunk to be un-loaded from the user interface shell, disabling said at least one application chunk; and
  wherein disabling said at least one application chunk comprises maintaining said at least one application chunk in an application chunk buffer of the memory of the at least one processing device.

20. The apparatus of claim 17 wherein running the application core comprises:
  at startup of the web application, displaying a user interface shell;
  reading application chunk definition metadata to identify a set of available ones of the plurality of application chunks;

monitoring user interface features of the web application to determine when respective ones of the plurality of page elements of the web application are selected; and responsive to identifying at least one application chunk to be loaded into the user interface shell:

reading chunk definition metadata for said at least one application chunk;

injecting one or more application chunk files and dependencies for said at least one application chunk specified in the chunk definition metadata;

boot-strapping one or more page elements of said at least one application chunk into an associated self-contained web application for said at least one application chunk; and linking the self-contained web application for said at least one application chunk to a communication bridge of the application core, the communication bridge being configured (i) to load shared object instances utilized by said at least one application chunk and (ii) to enable communication between said at least one application chunk and one or more other ones of the plurality of application chunks.

\* \* \* \* \*